United States Patent
Migl et al.

(10) Patent No.: US 11,578,653 B2
(45) Date of Patent: Feb. 14, 2023

(54) STEAM INJECTION INTO THE EXHAUST GAS RECIRCULATION LINE OF A GAS AND STEAM TURBINE POWER PLANT

(71) Applicant: Siemens Energy Global GmbH & Co. KG, Bayern (DE)

(72) Inventors: Matthias Migl, Munich (DE); Denis Tschetschik, Bubenreuth (DE)

(73) Assignee: Siemens Energy Global GmbH & Co. KG, Bayern (DE)

(*) Notice: Subject to any disclaimer, the term of this patent is extended or adjusted under 35 U.S.C. 154(b) by 0 days.

(21) Appl. No.: 17/272,289

(22) PCT Filed: Aug. 30, 2019

(86) PCT No.: PCT/EP2019/073189
§ 371 (c)(1),
(2) Date: Feb. 27, 2021

(87) PCT Pub. No.: WO2020/048882
PCT Pub. Date: Mar. 12, 2020

(65) Prior Publication Data
US 2021/0396159 A1  Dec. 23, 2021

(30) Foreign Application Priority Data
Sep. 7, 2018  (EP) .................................. 18193230

(51) Int. Cl.
*F02C 3/34* (2006.01)
*F01K 23/10* (2006.01)
(Continued)

(52) U.S. Cl.
CPC ............ *F02C 3/34* (2013.01); *F01K 23/10* (2013.01); *F02C 3/30* (2013.01); *F02C 6/18* (2013.01);
(Continued)

(58) Field of Classification Search
CPC .... F02C 3/34; F02C 3/30; F02C 3/305; F02C 6/18; F01K 23/10
See application file for complete search history.

(56) References Cited

U.S. PATENT DOCUMENTS 3,204,407 A    9/1965  Meissenberg
4,434,613 A *  3/1984  Stahl ................... F25J 3/04127
                                                          60/784
(Continued)

FOREIGN PATENT DOCUMENTS

CN       104014236 A  *  9/2014
EP         3011144 A2     4/2016

OTHER PUBLICATIONS

International search report and written opinion dated Jan. 15, 2020 for corresponding PCT/EP2019/073189.

*Primary Examiner* — William H Rodriguez
(74) *Attorney, Agent, or Firm* — Wolter Van Dyke Davis, PLLC

(57) ABSTRACT

A power plant having a gas turbine and having a heat recovery steam generator installed downstream of the gas turbine in the direction of flow of an exhaust gas, wherein the heat recovery steam generator includes heating surfaces of a high pressure section, of an intermediate pressure section and of a low pressure section, wherein an exhaust gas recirculation line branches from the heat recovery steam generator downstream of an evaporator in the flow direction of an exhaust gas in the high pressure section and opens again into the heat recovery steam generator upstream of the heating surfaces. A blower is arranged in the exhaust gas recirculation line, with a steam feed opening into the exhaust gas recirculation line downstream of the blower in the direction of flow of a recirculated exhaust gas. A method operates a power plant of this kind.

18 Claims, 1 Drawing Sheet

(51) Int. Cl.
   *F02C 3/30*   (2006.01)
   *F02C 6/18*   (2006.01)
(52) U.S. Cl.
   CPC ...... *F05D 2220/32* (2013.01); *F05D 2220/72* (2013.01)

(56) References Cited

U.S. PATENT DOCUMENTS

| | | | | |
|---|---|---|---|---|
| 8,051,638 B2* | 11/2011 | Aljabari | ............ | F02C 1/08 60/39.52 |
| 9,500,127 B2* | 11/2016 | Rofka | ............ | F02C 3/34 |
| 9,828,912 B2* | 11/2017 | De La Cruz Garcia | .. | F02C 3/34 |
| 10,612,424 B2 | 4/2020 | Lauzat | | |
| 2004/0224210 A1* | 11/2004 | Agnew | ............ | F02C 3/34 60/772 |
| 2006/0162315 A1 | 7/2006 | Bruckner | | |
| 2006/0272334 A1 | 12/2006 | Pranda | | |
| 2007/0044481 A1* | 3/2007 | Rabovitser | ............ | F02C 6/18 60/784 |
| 2008/0076080 A1 | 3/2008 | Hu | | |
| 2009/0120088 A1* | 5/2009 | Chillar | ............ | F02C 3/34 60/605.2 |
| 2009/0145127 A1* | 6/2009 | Vollmer | ............ | F01K 23/103 60/618 |
| 2009/0205334 A1* | 8/2009 | Aljabari | ............ | F02C 6/18 60/605.2 |
| 2010/0115960 A1* | 5/2010 | Brautsch | ............ | F23C 6/042 60/772 |
| 2012/0186268 A1* | 7/2012 | Rofka | ............ | F02C 3/34 60/783 |
| 2013/0174535 A1* | 7/2013 | Van Straaten | ............ | F02C 3/34 60/269 |
| 2014/0116023 A1* | 5/2014 | Anand | ............ | F02C 3/30 60/39.52 |
| 2014/0290264 A1* | 10/2014 | Hovel | ............ | F01K 23/10 60/772 |
| 2015/0114338 A1* | 4/2015 | Feinstein | ............ | F02C 7/10 123/25 A |
| 2016/0040558 A1 | 2/2016 | Bauer | | |

\* cited by examiner

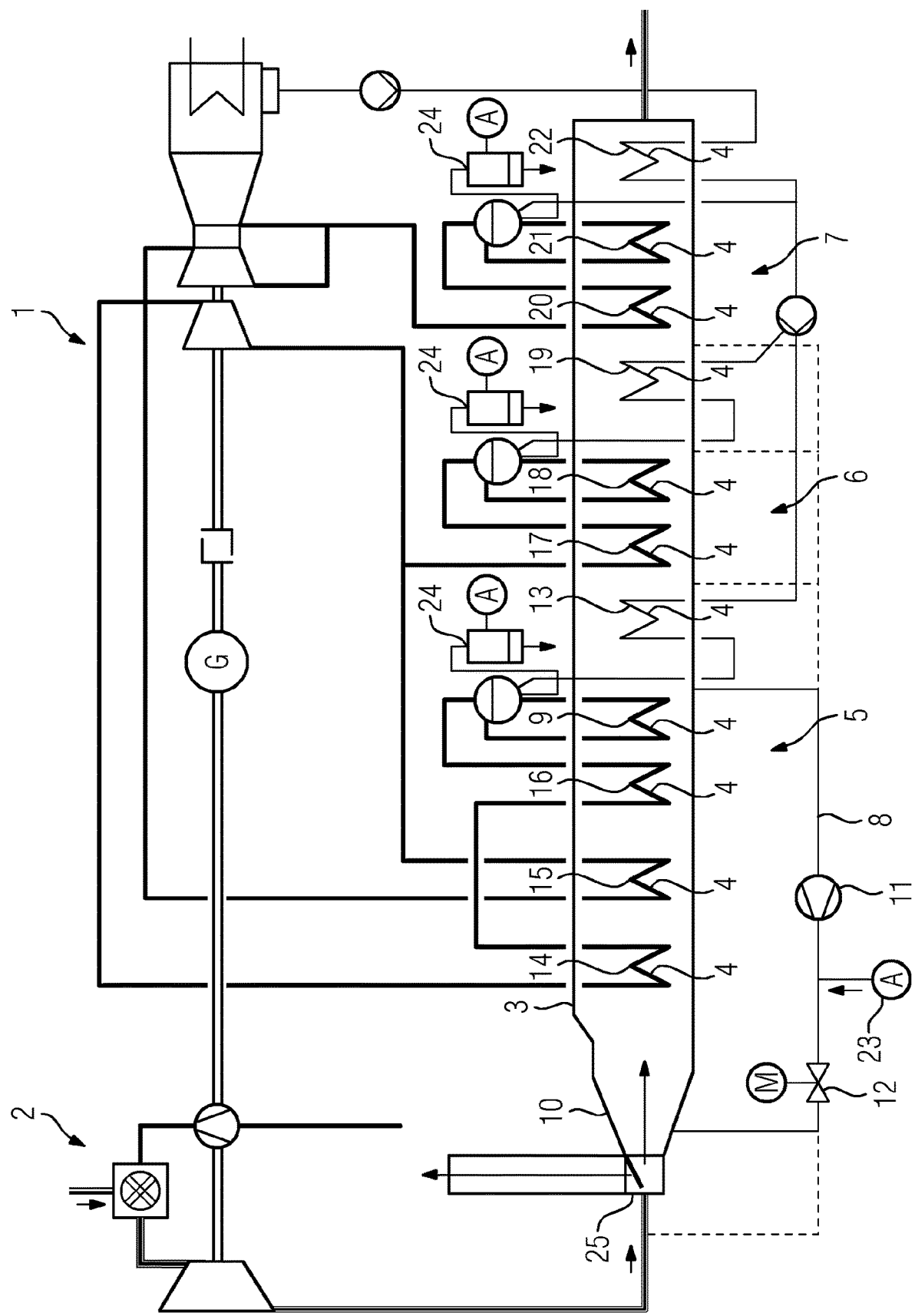

STEAM INJECTION INTO THE EXHAUST GAS RECIRCULATION LINE OF A GAS AND STEAM TURBINE POWER PLANT

CROSS REFERENCE TO RELATED APPLICATIONS

This application is the US National Stage of International Application No. PCT/EP2019/073189 filed 30 Aug. 2019, and claims the benefit thereof. The International Application claims the benefit of European Application No. EP18193230 filed 7 Sep. 2018. All of the applications are incorporated by reference herein in their entirety.

FIELD OF INVENTION

The invention relates to exhaust gas recirculation for reducing the lifetime consumption of heat recovery steam generators and for reducing emissions as well as for increasing the efficiency of modern gas and steam turbine plants during transient processes.

BACKGROUND OF INVENTION

For low-emission and lifetime-saving start-up of modern gas and steam turbine plants and for other transient processes, the heat recovery steam generator (HRSG) is kept momentarily at certain partial load points for heating up. On the one hand, this prolongs the start-up time of the power plants and thus leads to high fuel consumption with low efficiency of power generation and, on the other hand, the gas turbine is operated at a high emission level (carbon monoxide) for a long time as a result.

The heat recovery steam generator simply requires a certain time (>15 minutes) to reach sufficiently high temperatures in the pressure stages and upstream of any carbon monoxide catalyst located in the plant.

EP 3011144 A2 discloses a solution to the stated problem, in which water/deionized water is injected into the inflow hood of the heat recovery steam generator, wherein an exhaust gas temperature is reduced by the evaporation of the injected water/deionized water. One disadvantage of this system is the additional deionized water/water consumption. Another disadvantage is the significant reduction in the efficiency of the power plant (massive reduction in the exhaust gas enthalpy with a moderate increase in the exhaust gas mass flow) and the increase in the pressure loss on the exhaust gas side.

An alternative solution is to inject cold additional air into the inflow hood of the heat recovery steam generator. The disadvantage of this solution is that all pressure stages of the heat recovery steam generator are affected, which can lead to a possible overload of the medium-pressure and low-pressure sections of the heat recovery steam generator. Another disadvantage, as with the first solution, is the loss of efficiency of the power plant. In addition, the pressure loss on the exhaust gas side will increase and possibly reach the design values.

Methods that work with a reduction of the gas turbine exhaust gas temperature (ATK) lead to massive power and efficiency losses, as well as to a higher CO load during start-up.

In addition to the control of the exhaust gas temperature, the steam temperature control in the heat recovery steam generator by means of an injection cooler in interaction with the exhaust gas temperature is also problematic with regard to power plant efficiency as well as boiler service life.

US 2006/0162315 A1 discloses a power plant in which a portion of the exhaust gas is removed at one point in the heat recovery steam generator and recirculated to its inlet.

SUMMARY OF INVENTION

It is the object of the invention to provide a power plant which permits start-up with the lowest possible emissions and the least possible impact on service life and in which improved heat transfer between the exhaust gas and heating surfaces in the heat recovery steam generator is possible compared with prior art plants. A further object of the invention is to specify a corresponding method for operating such a power plant.

The invention achieves the object directed to a power plant by providing that, in such a power plant with a gas turbine and with a heat recovery steam generator connected downstream of the gas turbine in the direction of flow of an exhaust gas, wherein the heat recovery steam generator comprises heating surfaces of a high-pressure section, of a medium-pressure section and of a low-pressure section, wherein an exhaust gas recirculation line branches off from the heat recovery steam generator downstream of an evaporator of the high-pressure section in the direction of flow of an exhaust gas and opens into the heat recovery steam generator again upstream of the heating surfaces, wherein a blower is arranged in the exhaust gas recirculation line, and a steam feed opens into the exhaust gas recirculation line downstream of the blower in the direction of flow of a recirculated exhaust gas.

In order to minimize the above-mentioned negative effects (as well as the exergy loss due to steam injection in the high-pressure section and in the area of reheating), exhaust gas recirculation in the heat recovery steam generator with steam admixture is proposed. The gas turbine exhaust gases are at least partially recirculated to the heat recovery steam generator inlet well before the heat recovery steam generator outlet. This involves mixing of the recirculating exhaust gas (up to approx. 400° C.) with the exhaust gas from the gas turbine. A blower arranged in the exhaust gas recirculation line compensates (if necessary overcompensates) the comparatively small pressure difference between exhaust gas extraction and exhaust gas addition at the heat recovery steam generator. A steam feed opens into the exhaust gas recirculation line downstream of the blower in the direction of flow of a recirculated exhaust gas. The addition of steam to the exhaust gas improves the heat transfer of the exhaust gas to the downstream heating surfaces in the heat recovery steam generator.

It is advisable here for the power plant to comprise an inflow hood, via which, during operation, exhaust gas is supplied to downstream heating surfaces, wherein the exhaust gas recirculation line opens into the inflow hood.

It is furthermore advantageous if a control damper is arranged in the recirculation line. The control damper can be used to set a defined recirculated exhaust gas mass flow, and the control damper can furthermore ensure compensation for the pressure drop in the heat recovery steam generator.

It is advisable here for the steam feed to branch off from a boiler water expansion tank, which is used during blowdown (start-up and shutdown processes) and draining of steam generators to partially evaporate the blowdown water by expansion. The resulting steam is often discarded, but can also be mixed with the recirculated exhaust gases for energy recovery.

Furthermore, it is advantageous if the power plant comprises at least two exhaust gas recirculation lines, which are arranged substantially symmetrically and open into the inflow hood. Such an arrangement leads to homogeneous mixing of the recirculated exhaust gases with the exhaust gases coming directly from the gas turbine and fed into the heat recovery steam generator.

The object directed to a method is achieved by a method for operating a power plant with a gas turbine and a heat recovery steam generator, wherein the heat recovery steam generator comprises heating surfaces of a high-pressure section, of a medium pressure section and of a low-pressure section, wherein gas turbine exhaust gases are branched off downstream of an evaporator of the high-pressure section and are reintroduced into the heat recovery steam generator upstream of the heating surfaces, wherein steam is mixed into the recirculated exhaust gas.

In this case, it can be useful if the admixed steam is previously taken from a boiler water expansion tank.

It is advantageous if the gas turbine exhaust gases are branched off downstream of a high-pressure preheater in the heat recovery steam generator. A branch can take place directly downstream of a high-pressure preheater, but also further downstream, for example directly downstream of a medium-pressure evaporator or a medium-pressure preheater.

It is furthermore advantageous if gas turbine exhaust gases to be recirculated are captured by means of a blower and reintroduced into the heat recovery steam generator.

Furthermore, it is expedient if a recirculated exhaust gas quantity is set by means of a control damper.

To ensure that recirculated exhaust gas is added to the exhaust gas flow of the gas turbine as uniformly as possible over the circumference, it is advisable for recirculated exhaust gas to be supplied to the heat recovery steam generator at opposite positions on a circumference.

Finally, it is advantageous if at least some of a hot gas turbine exhaust gas is separated from the main mass flow of the exhaust gas by means of an exhaust gas diverter and supplied to the heat recovery steam generator and is mixed there with recirculated exhaust gas, thus enabling the power plant to be started up with power control and not via a temperature-controlled process as before. The gas turbine does not have to be reduced in its load or from the grid, which means that no second run curve is required for the gas turbine.

In the method according to the invention, boiler-specific requirements on the exhaust gas profile (velocity, temperature, temperature distribution) must be met for stable operation of the heat recovery steam generator. By varying the exhaust gas recirculation rate and the exhaust gas humidity, it is possible to set the absolute exhaust gas mixing temperature required for the high-pressure section, as well as the temperature transient, which will lead to the lowest lifetime consumption.

In addition, increasing the exhaust gas mass flow through the high-pressure section of the heat recovery steam generator and its humidity ensures that the heat recovery steam generator (especially the high-pressure evaporator) is warmed up more quickly and more steam will be produced faster than today. The acceleration of the warm-up process will also have a positive effect on the absorption of a possible CO catalyst. Instead of the 15 to 25 minutes usually required today to heat the high-pressure section, 5 to 7 minutes are now expected in the case of a boiler cold start. For warm and hot starts, the previous times will also be more than halved. The faster warm-up has time advantages for CO load control (emissions) when starting up the gas turbine or the heat recovery steam generator, especially in the USA.

Another positive effect is the independence from the exhaust gas temperature of the gas turbine. Particularly given the necessity of increasing the gas turbine exhaust gas temperature associated with part load owing to the CO problem, the high-pressure superheater/reheater intermediate injection coolers previously had to reduce the temperature of the steam so that design specifications were not jeopardized. The elimination of this measure leads to a further increase in the efficiency of the plant at part load.

Further positive effects are seen in the substantial increase in the operating range of the plant, especially for power plants with large process steam output. The recirculation of the exhaust gas helps to maintain steam production in the heat recovery steam generator when the output of the gas turbine decreases.

If, in future gas turbine development, the exhaust gas temperature is to rise sharply (e.g. >700° C.), recirculation could be used to reduce the boiler inlet temperature again. It is thus possible to avoid the necessity of using the materials required for very high steam temperatures (Ni alloys), leading to a massive cost saving.

The previous temperature gradient control is now taken over by this proposed exhaust gas recirculation.

The invention offers numerous advantages. The efficiency of the system in partial loads is increased by up to 0.55-0.60% points net overall efficiency (CCGT) by the fact that high-pressure superheater/reheater injection coolers are not needed during the dynamic and static processes. The injection coolers (especially the intermediate injection coolers) are then only to be regarded as emergency injectors. In this case, it may be possible to make them smaller.

The invention results in an overall CCGT efficiency increase at minimum loads and during start-up of the CCGT plant, as well as improved minimum load emissions, especially with respect to carbon monoxide. For gas turbine minimum loads, a partial load exhaust gas temperature boost is usually installed for CO reduction to better reduce carbon monoxide emissions.

The operating range of the power plant increases not only for pure condensing operation owing to the now reduced CO problem, but also for power plants with larger process steam extraction quantities. Process steam is usually extracted in the area of cold reheating. However, this steam is then "missing" when the reheater heating surfaces are appropriately charged with the hot gas turbine exhaust gas. The extraction of process steam is common in the industrial sector. Large CCGT power plants also sometimes serve large steam extraction volumes.

Another advantage is that the exhaust gas volume required for the high-pressure section at very low gas turbine outputs and high exhaust gas temperatures, which ensures stable evaporation, is positively influenced by exhaust gas recirculation since steam production in the lower load range of the gas turbine does not drop sharply even though the gas turbine exhaust gas volume decreases (so-called "extended turndown" operation of the gas turbines).

With the invention, the gas turbine can be started up as quickly as desired without significantly increasing the lifetime consumption of the pressurized components of the steam generator and does not have to maintain any stopping points since the temperature transient for the heat recovery steam generator can be adjusted via the recirculation.

This means that the operating mode of rotating energy machines (steam/gas turbines) can be changed without any significant increase in the lifetime consumption of the pressurized components of the steam generator.

Increasing the exhaust gas mass flow and its humidity in certain areas of the heat recovery steam generator results in reduced boiler warm-up times (especially in the case of a cold start). Therefore, initial steam production is achieved more quickly than usual. The necessary operating temperatures of CO+SCR catalysts are also reached more quickly. Warm-up of a possible CO catalyst, for a reduction of CO emissions with load control is already possible during start-up (CO catalyst placed in front of or behind high pressure evaporator, depending on temperature window). This is especially interesting for US plants, where CO load control has already been introduced.

By reducing material depletion, boiler construction (hardware) can be done more cost-effectively.

Since the (initial) steam produced is colder than usual, steam turbine warm-up is also assisted, especially during cold starts.

Irrespective of the gas turbine type, "hot ventilation" is possible in the area of the heat recovery steam generator due to the adjustability of the exhaust gas temperature, if an exhaust gas diverter (diverter damper) is available. With the exhaust gas diverter, some of the hot gas turbine exhaust gas is diverted and supplied to the heat recovery steam generator, where it is mixed with the recirculated exhaust gas, thus enabling the exhaust gas temperature and quantity to be adjusted.

The proposed solution can be retrofitted for old heat recovery steam generators/power plants to which a new, more efficient upstream gas turbine is fitted.

Furthermore, the invention is applicable to all types of boilers, such as separators (Benson), drums, and various types of evaporators (upright, horizontal, etc.).

BRIEF DESCRIPTION OF THE DRAWINGS

The invention is explained in more detail by way of example with reference to a drawing.

The FIGURE shows schematically a power plant.

DETAILED DESCRIPTION OF INVENTION

By way of example, the FIGURE shows schematically a power plant 1 with a gas turbine 2 and with a heat recovery steam generator 3 connected downstream of the gas turbine 2 in the direction of flow of an exhaust gas, wherein the heat recovery steam generator 3 comprises an inflow hood 10 via which, during operation, exhaust gas from the gas turbine 2 is supplied to downstream heating surfaces 4. In addition, the power plant 1 of the FIGURE also has an exhaust gas diverter 25, by means of which gas turbine exhaust gases can be diverted onto or away from the heat recovery steam generator 3 as required.

In the direction of flow of the exhaust gas, the FIGURE shows in heat recovery steam generator 3 a second high-pressure superheater 14, a reheater 15, a first high-pressure superheater 16, a high-pressure evaporator 9, a high-pressure preheater 13, a medium-pressure superheater 17, a medium-pressure evaporator 18, a medium-pressure preheater 19, a low-pressure superheater 20, a low-pressure evaporator 21 and a condensate preheater 22.

The heating surfaces 4 can thus be grouped into three groups: a high-pressure section 5, a medium-pressure section 6 and a low-pressure section 7.

In the embodiment example shown in the FIGURE, an exhaust gas recirculation line 8 branches off from the heat recovery steam generator 3 directly downstream of the evaporator 9 of the high-pressure section 5 in the direction of flow of an exhaust gas, and opens into the heat recovery steam generator 3 again upstream of the heating surfaces 4. In heat recovery steam generators with an exhaust gas diverter 25, the mouth of the exhaust gas recirculation line 8 is upstream of the exhaust gas diverter 25. In systems without an exhaust gas diverter 25, the recirculated exhaust gas can discharge directly into the inflow hood 10 (dashed line).

As an alternative to the solution shown with the solid line, the exhaust gas recirculation line 8 branches off further downstream from the heat recovery steam generator 3, either directly downstream of the high-pressure feed water preheater 13 or downstream of the medium-pressure evaporator 18 or even downstream of the medium-pressure preheater 19 (dashed lines).

Only a single exhaust gas recirculation line 8 is shown in the FIGURE. However, for reasons of better mixing of recirculated exhaust gas and the exhaust gas from the gas turbine, an advantageous embodiment will have at least a second exhaust gas recirculation line 8 as well.

A blower 11 and a control damper 12 are arranged in the exhaust gas recirculation line 8.

Furthermore, in the embodiment example of the FIGURE, a steam feed 23 is shown which flows into the exhaust gas recirculation line 8 and is fed from at least one boiler water expansion tank 24. The FIGURE shows mutually independent boiler water expansion tanks 24 of all pressure sections 5, 6 and 7. Alternatively, steam can of course also be taken from a so-called cascading blowdown, in which boiler water expansion tanks of a higher pressure stage discharge their wastewater into the drum of the lower pressure stage.

The invention claimed is:

1. A power plant comprising:
   a gas turbine, and
   a heat recovery steam generator connected downstream of the gas turbine in the direction of flow of an exhaust gas,
   wherein the heat recovery steam generator comprises heating surfaces of a high-pressure section, of a medium-pressure section and of a low-pressure section,
   wherein an exhaust gas recirculation line branches off from the heat recovery steam generator downstream of an evaporator of the high-pressure section in the direction of flow of an exhaust gas and opens into the heat recovery steam generator again upstream of the heating surfaces,
   wherein a blower is arranged in the exhaust gas recirculation line,
   wherein a steam feed branches off from a boiler water expansion tank and opens into the exhaust gas recirculation line downstream of the blower in the direction of flow of a recirculated exhaust gas.

2. The power plant as claimed in claim 1, further comprising:
   an inflow hood, via which, during operation, exhaust gas is supplied to downstream heating surfaces, wherein the exhaust gas recirculation line opens into the inflow hood.

3. The power plant as claimed in claim 1,
   wherein a control damper is arranged in the exhaust gas recirculation line.

4. The power plant as claimed in claim 1, further comprising:
   at least two exhaust gas recirculation lines, which are arranged symmetrically with respect to a circumference of the heat recovery steam generator and open into the inflow hood.

5. The power plant as claimed in claim 1, wherein the exhaust gas recirculation line opens downstream of the gas turbine and into the heat recovery steam generator.

6. The power plant as claimed in claim 1, wherein the blower is arranged in the exhaust recirculation line to compensate for a pressure difference between the exhaust gas from the gas turbine and the recirculated exhaust gas that passes through the exhaust gas recirculation line and into the heat recovery steam generator.

7. The power plant as claimed in claim 1, wherein the steam feed is configured to add steam to the recirculated exhaust gas in the exhaust gas recirculation line to improve a heat transfer of the exhaust gas at the heating surfaces within the heat recovery steam generator.

8. The power plant as claimed in claim 1, wherein the exhaust gas recirculation line has a first end that branches off from the heat recovery steam generator and a second end that opens downstream of the gas turbine into the heat recovery steam generator and wherein the steam feed opens into the exhaust gas recirculation line between the first end and the second end.

9. A method for operating a power plant having a gas turbine and a heat recovery steam generator, wherein the heat recovery steam generator comprises heating surfaces of a high-pressure section, of a medium-pressure section and of a low-pressure section, the method comprising:
- branching off, with an exhaust gas recirculation line, a recirculated exhaust gas from gas turbine exhaust gases downstream of an evaporator of the high-pressure section and reintroducing the recirculated exhaust gas into the heat recovery steam generator upstream of the heating surfaces including arranging a blower in the exhaust gas recirculation line and opening a steam feed that branches off from a boiler water expansion tank into the exhaust gas recirculation line downstream of the blower, and
- mixing steam into the recirculated exhaust gas.

10. The method as claimed in claim 9,
wherein an admixed steam is previously taken from the boiler water expansion tank.

11. The method as claimed in claim 9,
wherein the gas turbine exhaust gases are branched off downstream of a high-pressure preheater in the heat recovery steam generator.

12. The method as claimed in claim 9,
wherein gas turbine exhaust gases to be recirculated are captured by the blower and reintroduced into the heat recovery steam generator.

13. The method as claimed in claim 9,
wherein a recirculated exhaust gas quantity is set by a control damper.

14. The method as claimed in claim 9,
wherein the recirculated exhaust gas is supplied to the heat recovery steam generator at opposite positions.

15. The method as claimed in claim 9,
wherein at least some of a hot gas turbine exhaust gas is separated from a main mass flow of the exhaust gas by an exhaust gas diverter and is supplied to the heat recovery steam generator and is mixed there with recirculated exhaust gas, thus enabling the power plant to be started up with power control.

16. The method as claimed in claim 9,
wherein the branching off step comprises branching off, with the exhaust gas recirculation line, the recirculated exhaust gas from gas turbine exhaust gases downstream of the evaporator of the high pressure section and reintroducing the recirculated exhaust gas downstream of the gas turbine and into the heat recovery steam generator;
and wherein the mixing steam step includes mixing steam into the recirculated exhaust gas in the exhaust gas recirculation line.

17. The method as claimed in claim 16, further comprising controlling a mass flow rate and a humidity of the recirculated exhaust gas in the exhaust gas recirculation line.

18. A power plant comprising:
a gas turbine, and
a heat recovery steam generator connected downstream of the gas turbine in the direction of flow of an exhaust gas,
wherein the heat recovery steam generator comprises heating surfaces of a high-pressure section, of a medium-pressure section and of a low-pressure section,
wherein an exhaust gas recirculation line branches off from the heat recovery steam generator downstream of an evaporator of the high-pressure section in the direction of flow of an exhaust gas and opens into the heat recovery steam generator again upstream of the heating surfaces,
wherein a blower is arranged in the exhaust gas recirculation line,
wherein a steam feed branches off from a boiler water expansion tank and opens into the exhaust gas recirculation line downstream of the blower in the direction of flow of a recirculated exhaust gas, and,
wherein an exhaust gas diverter is configured to divert the exhaust gas away from or into the heath recovery steam generator, wherein a mouth of the exhaust gas recirculation line opens upstream of the exhaust gas diverter and downstream of the gas turbine.

* * * * *